(12) United States Patent
Okuda

(10) Patent No.: US 7,497,612 B2
(45) Date of Patent: Mar. 3, 2009

(54) ELECTRO-OPTICAL DEVICE AND ELECTRONIC APPARATUS

(75) Inventor: Tatsumi Okuda, Motosu (JP)

(73) Assignee: Epson Imaging Devices Corporation (JP)

( * ) Notice: Subject to any disclaimer, the term of this patent is extended or adjusted under 35 U.S.C. 154(b) by 0 days.

(21) Appl. No.: 11/933,570

(22) Filed: Nov. 1, 2007

(65) Prior Publication Data
US 2008/0106915 A1    May 8, 2008

(30) Foreign Application Priority Data

Nov. 2, 2006  (JP)  ............... 2006-298555
Aug. 9, 2007  (JP)  ............... 2007-207502

(51) Int. Cl.
*F21V 8/00*    (2006.01)

(52) U.S. Cl. ............... 362/633; 362/616; 362/628; 362/602

(58) Field of Classification Search ............... 362/602, 362/615, 616, 628, 632, 633, 634
See application file for complete search history.

(56) References Cited

FOREIGN PATENT DOCUMENTS

JP    2003-242822    8/2003
JP    2004-46050    2/2004

*Primary Examiner*—Laura Tso
(74) *Attorney, Agent, or Firm*—Harness, Dickey & Pierce, P.L.C.

(57) ABSTRACT

An electro-optical device includes a lighting device including a light guiding plate and a light source emitting light to the light guiding plate which are received in a frame, and a displaying panel, in which the light guiding plate has an inclined portion which gradually becomes thicker as it becomes nearer the light source, and the frame as a frame protrusion facing the inclined portion of the light guiding plate.

7 Claims, 13 Drawing Sheets

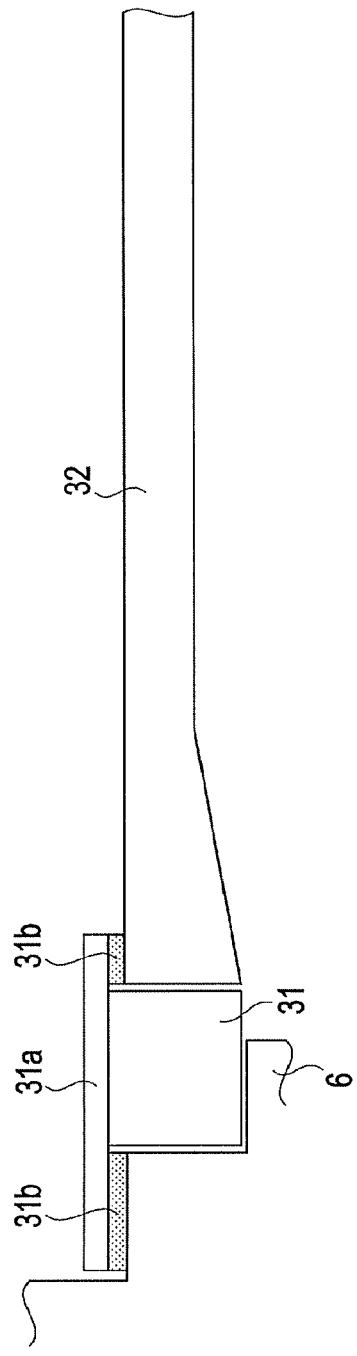
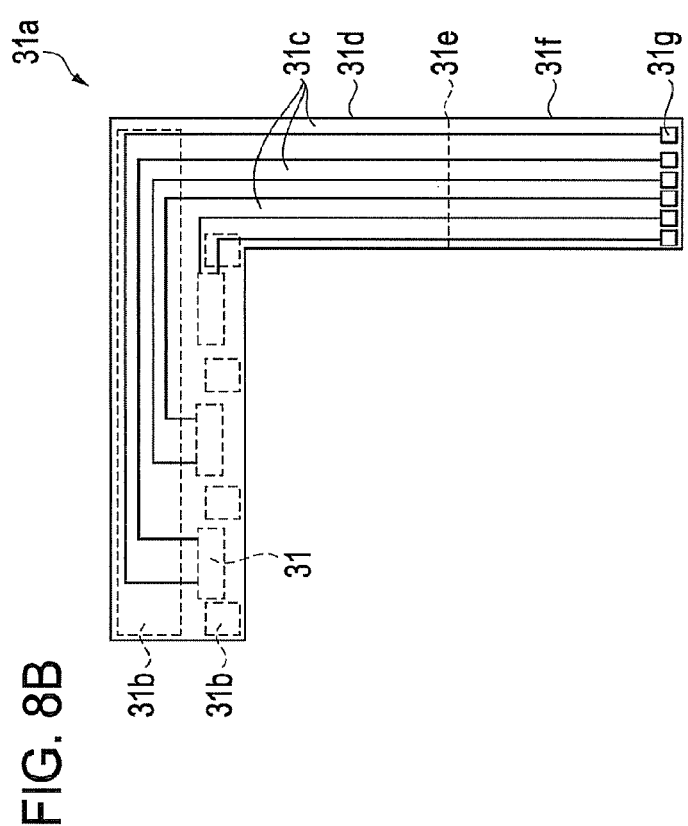
FIG. 8A
FIG. 8B

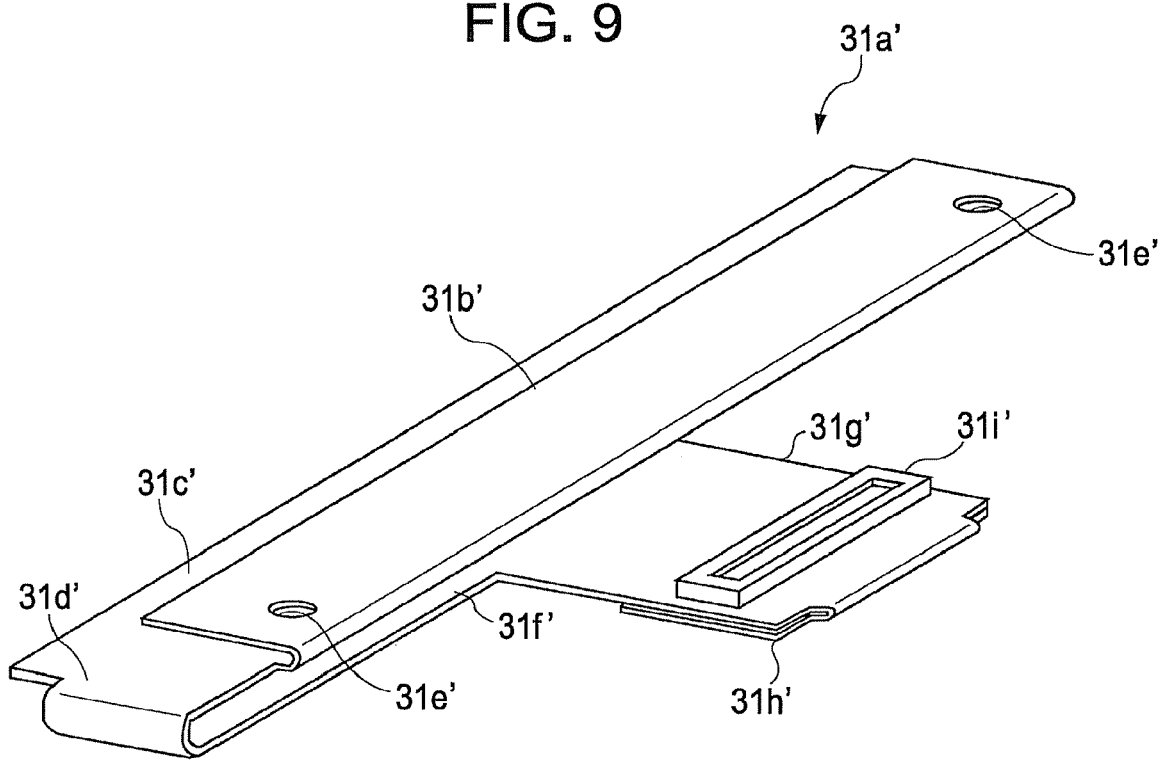

ELECTRO-OPTICAL DEVICE AND ELECTRONIC APPARATUS

The entire disclosure of Japanese Patent Application Nos. 2006-298555, filed Nov. 2, 2006 and 2007-207502, filed Aug. 9, 2007 are expressly incorporated by reference herein.

BACKGROUND

1. Technical Field

The present invention relates to an electro-optical device and all electronic apparatus, and more particularly to an electro-optical device which is less affected by interference fringes by the presence of a frame protrusion and an electronic apparatus having the electro-optical device.

2. Related Art

As for electro-optical devices, liquid crystal display (LCD) devices have been widely used. The liquid crystal display device includes a plurality of pixel regions provided between opposing electrodes and modulates light passing through a liquid crystal material provided at the pixel regions by selectively applying a voltage to the pixel regions, thereby displaying an image of pictures or characters as a whole.

Recently, double-sided displaying type LCD devices have been developed in order to realize multifunctional display devices. However, known double-sided displaying type LCD devices have a problem in that it has relatively lower brightness in comparison with single-sided displaying type liquid crystal display devices, that is, it is impossible to achieve sufficient brightness because light from a single light source and a single light guiding plate enters two liquid crystal panels.

In order to solve the above-mentioned problem, JP-A-2004-46050 discloses another double-sided displaying type LCD device as shown in FIG. 15. In this LCD device, LCD panels 307 and 308 are arranged on both sides of a single light guiding plate 302, respectively, which has an end with a light source 301 thereon, reflective polarizing plates 305 and 306 are interposed between the light guiding plate 302 and the LCD panel 307 and between the light guiding plate 302 and the LCD panel 308, respectively, and transmission axes of the reflective polarizing plates 305 and 306 are adjusted.

In greater detail, the transmission axes of the reflective polarizing plates 305 and 306 are aligned with transmission axes of liquid crystal panel polarizing plates 309 and 310, respectively, facing the reflective polarizing plates 305 and 306. That is, the transmission axes of the reflective polarizing plate 305 and the liquid crystal panel polarizing plate 309 disposed on the same side with respect to the light guiding plate 302 are aligned with each other, and the transmission axes of the reflective plate 306 and the liquid crystal panel polarizing plate 310 disposed on the same side with respect to the light guiding plate 302 are aligned with each other. On the other hand, the transmission axes of the reflective polarizing plate 305 and the liquid crystal panel polarizing plate 309 disposed on the same side with respect to the light guiding plate 302 orthogonally intersect the transmission axes of the reflective polarizing plate 306 and the liquid crystal panel polarizing plate 310 disposed on the opposite side across the light guiding plate 302.

However, the double-sided displaying type LCD device disclosed in the above-mentioned patent document still encounters many problems. For example, light from a light source is not effectively used and light is not uniformly guided over the entire area of the light guiding plate.

As for the double-sided displaying type LCD device, there is a further known technique in which a light guiding plate having an inclined portion (also called a wedge portion) which becomes thicker as it becomes nearer a light source is used in the LCD device. This LCD device also has a problem in that light is apt to leak from the inclined portion and thus interference fringes are easily formed.

SUMMARY

An advantage of some aspects of the invention is that it provides an electro-optical device which is less affected by interference fringes by providing an inclined portion having a predetermined shape at an end portion of a light guiding plate and using a frame having a frame protrusion covering the inclined portion of the light guiding plate.

That is, an advantage of some aspect of the invention is to provide an electro-optical device which is less affected by interference fringes in both cases in which the optical device includes a single displaying panel and the optical device includes a plurality of displaying panels, and to provide an electronic apparatus having the electro-optical device.

A first aspect of the invention is to provide an electro-optical device including a lighting device having a light guiding plate received in a frame and a light source emitting light toward the light guiding plate, and a displaying panel. The light guiding plate has an inclined portion which becomes gradually thicker as it becomes nearer the light source. The frame has a frame protrusion facing the inclined portion of the light guiding plate.

That is, the frame protrusion provided to the frame effectively reflects light leaking from the inclined portion, which leads to suppress influence of interference fringes on a first displaying panel and a second displaying panel and contributes to effective use of light from the light source. As a result, brightness of electro-optical device can be enhanced.

Further, by the presence of the frame protrusion provided to the frame, the second displaying panel can be more securely fixed and thus displacement of the second displaying panel is reduced even at a high ambient temperature. As a result, it is possible to realize the electro-optical device with high brightness.

In the electro-optical device, it is preferable that the frame protrusion is formed along all exterior profile of the inclined portion of the light guiding plate and an angle of the inclined portion of the light guiding plate is almost equal to an angle of the frame protrusion.

With such structure, it is possible to vary positions of the interference fringes by changing the angle of the frame protrusion and to suppress influence of the interference fringes on the second displaying panel.

In the electro-optical device, it is preferable that the displaying panel is composed of the first displaying panel and the second displaying panel having different displaying areas, in which the second displaying panel having a relatively large displaying area is arranged on the first surface of the light guiding plate on which the inclined portion is disposed and the first displaying panel having a relatively small displaying area is arranged on the second surface of the light guiding plate on which the inclined portion is not disposed.

With such structure including the first and second displaying panels having different displaying areas, it is possible to realize the double-sided displaying type electro-optical device which is less affected by interference fringes.

In the electro-optical device, it is preferable that an end of a displaying region of the second displaying panel is arranged nearer the light source than an end of a displaying region of the first displaying panel.

With such structure, even if light leakage occurs around the inclined portion, it is possible to control interference fringes on the second displaying panel so as to be formed at a position near the light source.

In the electro-optical device, it is preferable that a light reflective portion (hereinafter, including a light scattering member) is provided between the frame protrusion and the inclined portion of the light guiding plate.

With such structure, it is possible to effectively use the light from the light source, and to suppress influence of interference fringes on the second displaying panel.

In the electro-optical device, it is preferable that die frame protrusion is provided by a light reflective member (hereinafter, including a light scattering member).

With such structure, it is possible to simplify the structure of the frame and improve the light reflective characteristic of the frame protrusion.

A second aspect of the invention is to provide an electronic apparatus having the electro-optical device.

With such structure, it is possible to realize an electronic apparatus having the single-sided displaying type electro-optical device or the double-sided displaying type electro-optical device which has enhanced brightness and is less affected by interference fringes.

BRIEF DESCRIPTION OF THE DRAWINGS

The invention will be described with reference to the accompanying drawings, wherein like numbers reference like elements.

FIGS. 8A and 8B are views illustrating one exemplary light source circuit substrate on which a light source is mounted.

FIG. 9 is a view illustrating another exemplary light source circuit substrate on which a light source is mounted.

DESCRIPTION OF EXEMPLARY EMBODIMENTS

With reference to the accompanying drawings, embodiments of an electro-optical device and an electronic apparatus according to the invention will be described in detail. The embodiments are just provided as examples of the invention and thus the embodiments are not construed to limit the scope of the invention. Thus embodiments can be arbitrarily modified within the scope of the invention.

First Embodiment

Figure 1:
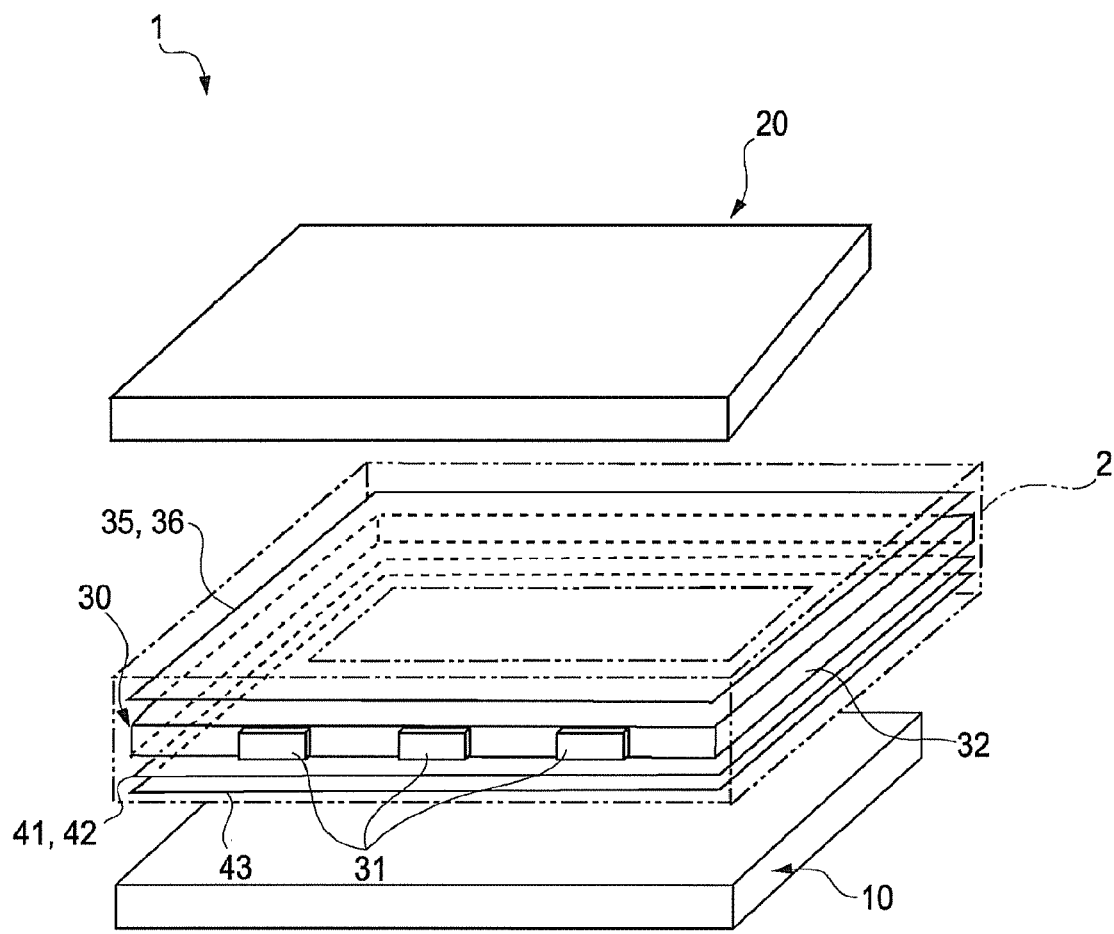
FIG. 1 is a schematic view illustrating a liquid crystal device according to a first embodiment.
Figure 2:
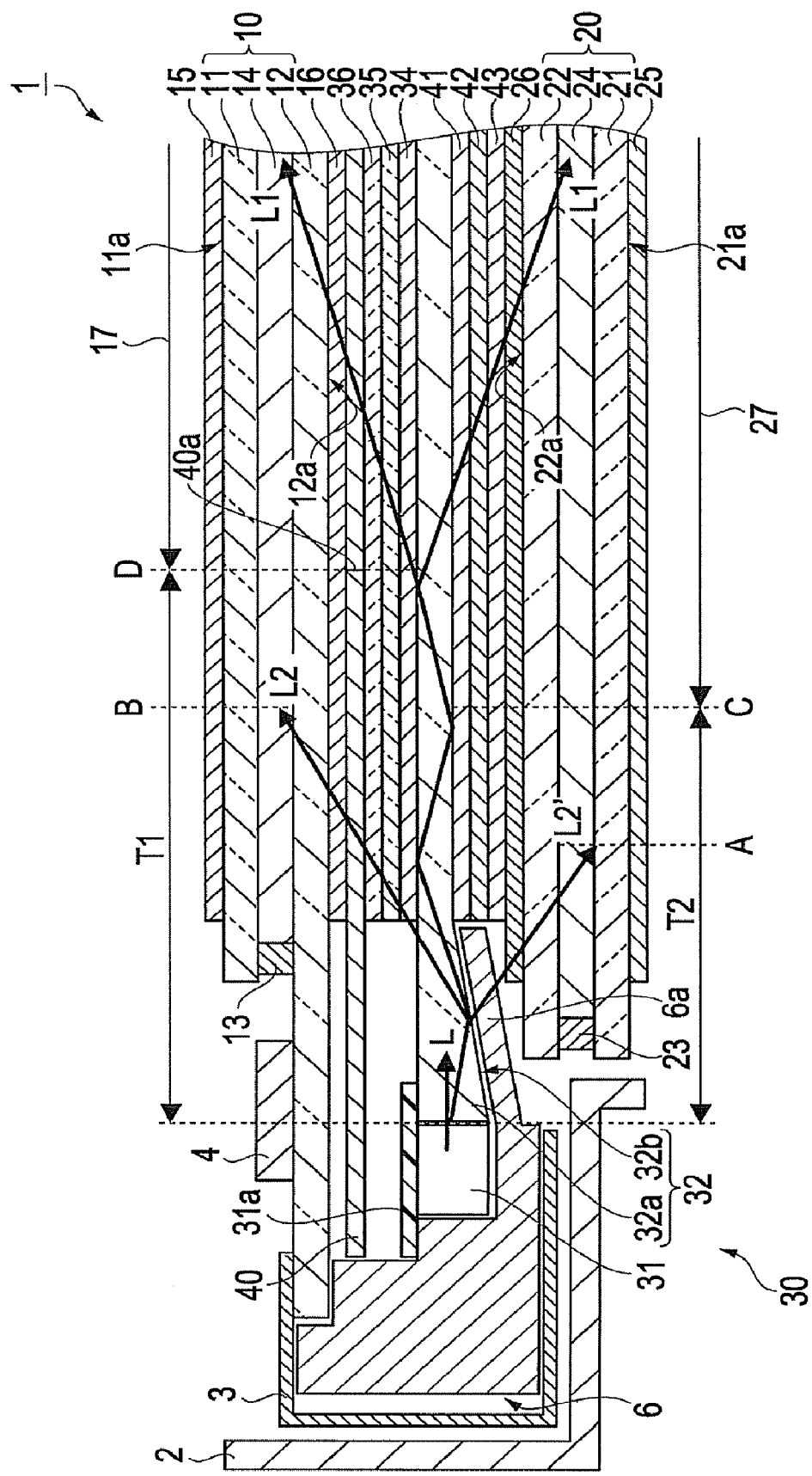
FIG. 2 is a schematic sectional view illustrating the liquid crystal device according to the first embodiment.

As shown in FIGS. 1 and 2, the first embodiment relates to an electro-optical device (liquid crystal device) 1 including a lighting device 30 composed of a light source 31 for allowing light L to be incident onto a light guiding plate 32 and the light guiding plate 32 received within a frame 6, a first displaying panel 10, and a second displaying panel 20. The light guiding plate 32 has an inclined portion 32b which becomes thicker as it becomes nearer the light source 31, and the frame 6 has a frame protrusion 6a facing the inclined portion 32b of the light guiding plate 32.

Hereinafter, a liquid crystal device including a first displaying panel and a second displaying panel is exemplified as the electro-optical device according to this embodiment.

In explanation below, the term "displaying panel" means parts for an optical device in which a liquid crystal material is injected into a gap provided between a pair of substrates which are bonded to each other using a sealing material. The term "liquid crystal device" means an electro-optical device in which a flexible circuit substrate, electronic parts, and a light source are mounted on the displaying panel.

For convenience's sake of explanation, the second displaying panel 20 is shown on an upper side of the first displaying panel 10 in FIG. 1 but conversely is shown on a lower side of the first displaying panel 10 in FIG. 2. Further, the structure of the inclined portion 32b of the light guiding plate 32 is illustrated in simplified manner in FIG. 1, but is illustrated in emphasized manner n FIG. 2.

As shown in FIGS. 1 and 2, the liquid crystal device 1 is received in a casing 2 and includes a first displaying panel 10 composed of a pair of substrates 11 and 12, a second displaying panel 20 composed of a pair of substrate 21 and 22, and a lighting device 30.

The second displaying panel 20 has a displaying region 27 having an area which is larger than that of a displaying region 17 of the first displaying panel 10. The first displaying panel 10 and the second displaying panel 20 are arranged in a manner such that at least parts of the first displaying region 17 and the second displaying region 27 overlap each other when viewed in the vertical direction.

The lighting device 30 includes a light source 31 and a light guiding plate 32. The light device 30 is used as a shared back light unit for the first displaying panel 10 and the second displaying panel 20.

As shown in FIG. 2, the first displaying panel 10 includes a pair of rectangular substrates 11 and 12 facing each other with a cell gap defined by a sealing member 13 in between and a liquid crystal layer 14 (electro-optical material) interposed between the substrates 11 and 12. The lighting device 30 is arranged near the substrate 12 of the first displaying panel 10.

A light-emission side polarizing plate 15 is disposed on the outer surface 11a of the substrate 11 and a light-incidence side polarizing plate 16 is disposed on the outer surface 12a of the substrate 12. Mounted on the substrate 12 is a driver IC 4 which performs image displaying processing for the first displaying panel 10 and the second displaying panel 20.

As shown in FIG. 2, like the first displaying panel 10, the second displaying panel 20 includes a pair of rectangular substrates 21 and 22 facing each other with a cell gap defined by a sealing member 23 in between and a liquid crystal layer 24 (electro-optical material) interposed between the substrates 21 and 22. The lighting device 30 shared by both the first displaying panel 10 and the second displaying panel 20 is arranged near the substrate 22 of the second displaying panel 20.

A light-emission side polarizing plate 25 is disposed on the outer surface 21*a* of the substrate 21 and a light-incidence side polarizing plate 26 is disposed on the outer surface of the substrate 22.

The substrates 11, 12, 21, and 22 are light-transmissible substrates made of a transparent material, such as glass or acryl resin.

Figure 3:
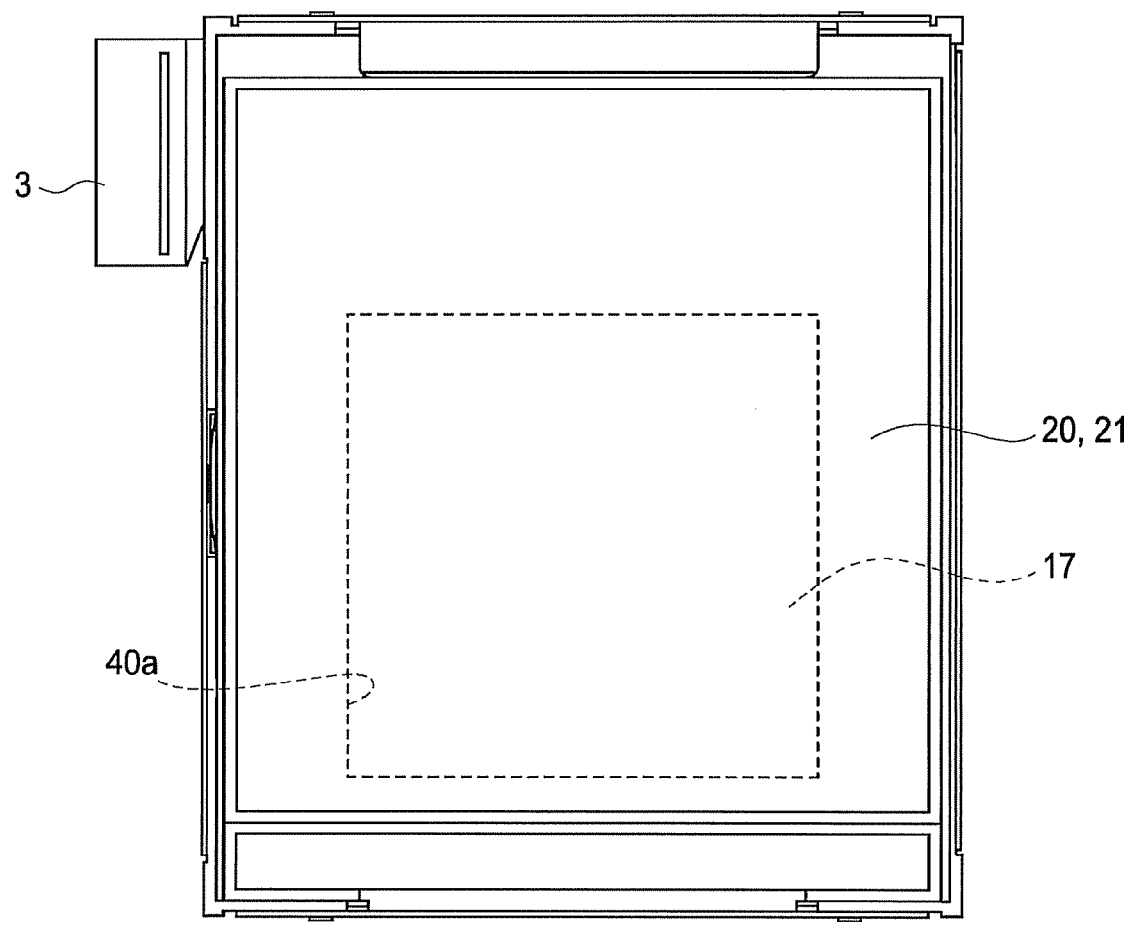
FIG. 3 is a plan view illustrating the front surface of the liquid crystal device according to the first embodiment.
Figure 4:
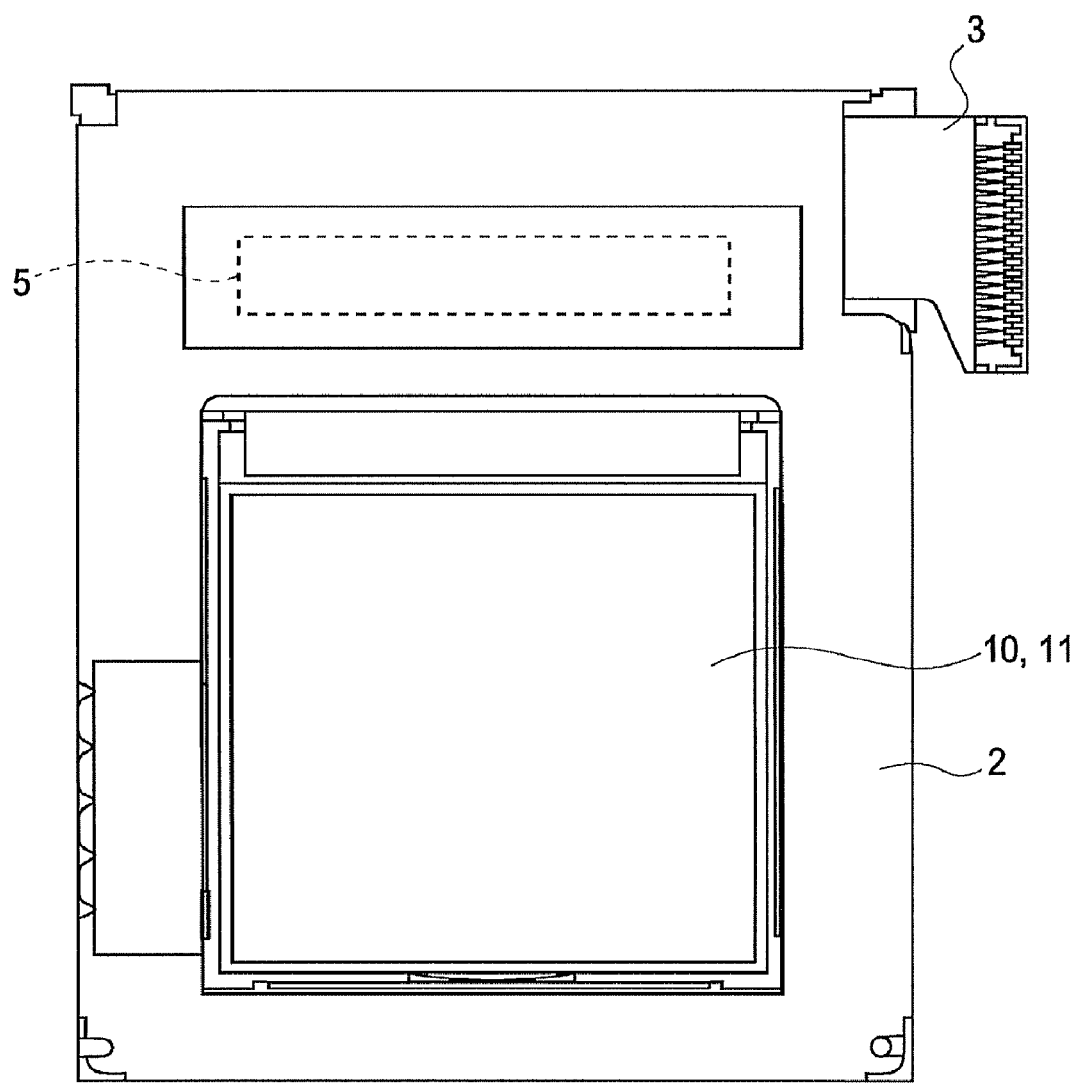
FIG. 4 is a plan view illustrating the rear surface of the liquid crystal device according to the first embodiment.

As shown in FIGS. 3 and 4, a flexible circuit substrate 3 (FPC substrate) 3 is mounted at the end portions of the first displaying panel 10 and the second displaying panel 20 using a conductive material (not shown), such as an unisotrophic conductive film. The FPC substrate 3 is a flexible circuit substrate having flexibility and electronic parts 5 are mounted on the FPC substrate 3.

Accordingly, when the light source 31 is lit up in the state in which the driver IC 4 and the electronic parts 5 are controlled, light L from the light source 31 is made incident onto the side of the light guiding plate 32 and is then emitted from the front surface and the rear surface of the light guiding plate 32. By the use of the light emitted from the light guiding plate 32, the first displaying panel 10 and the second displaying panel 20 can perform displaying of a predetermined image.

In the case in which thickness of the liquid crystal device 1 is not restricted, a light absorbing member 40 which absorbs or reflects light is arranged in the liquid crystal device 1 in order to absorb or reflect light leaking from the liquid crystal device 1.

That is, as shown in FIG. 2, the light absorbing member 40 is disposed between the first displaying panel 10 and the second displaying panel 20, and more precisely disposed on the rear surface side of the light guiding plate 32. That is, the light absorbing member 40 is provided outside the displaying region 17 of the first displaying panel 10. However, as indicated by a dotted line in FIG. 3, the light absorbing member 40 has an opening having almost the same size as the displaying region 17 of the first displaying panel 10.

Thanks to the light absorbing member 40 having such structure, it is possible to absorb a light component which is irradiated from the upper surface of the light guiding plate 32, i.e. from the first displaying panel 10 and which directs toward the region other than the displaying region 17 of the first displaying panel 10, and a light component which is reflected from the inner surface of the casing 2 and a frame protrusion 6*a* and advances from the first displaying panel 10 to the second displaying panel 20.

Accordingly, the light absorbing member 40 affects the second displaying panel 20 in a manner such that it prevents the reflection of the first displaying panel 10 from being visible on the second displaying panel 20 by absorbing the light component emitted from a region where the first displaying panel 10 is not provided. Further, the light absorbing member 40 affects the first displaying panel 10 in a manner such that it enables light transmission through the first displaying panel 10, precisely through the opening 40*a* in a region where the first displaying panel 10 is disposed.

By arranging an end portion D of the displaying region 17 of the first displaying panel 10 and an end portion C of the displaying region 27 of the second displaying panel 20 near the light source 31, it is possible to change positions of the interference fringes. If the interference fringes can be formed outside the displaying regions 17 and 27 of the first displaying panel 10 and the second displaying panel 20, respectively, the above-mentioned advantage may be achieved even lacking the light absorbing member 40.

Lighting Device

As shown in FIG. 2, the lighting device 30 includes a frame 6, the light source 31 mounted on the light source circuit substrate 31*a* electrically connected to both the first displaying panel 10 and the second displaying panel 20, and the light guiding plate 32 which effectively guides the light L1 emitted from the light source 31 to the first displaying panel 10 and the second displaying panel 20.

Frame

Figure 5:
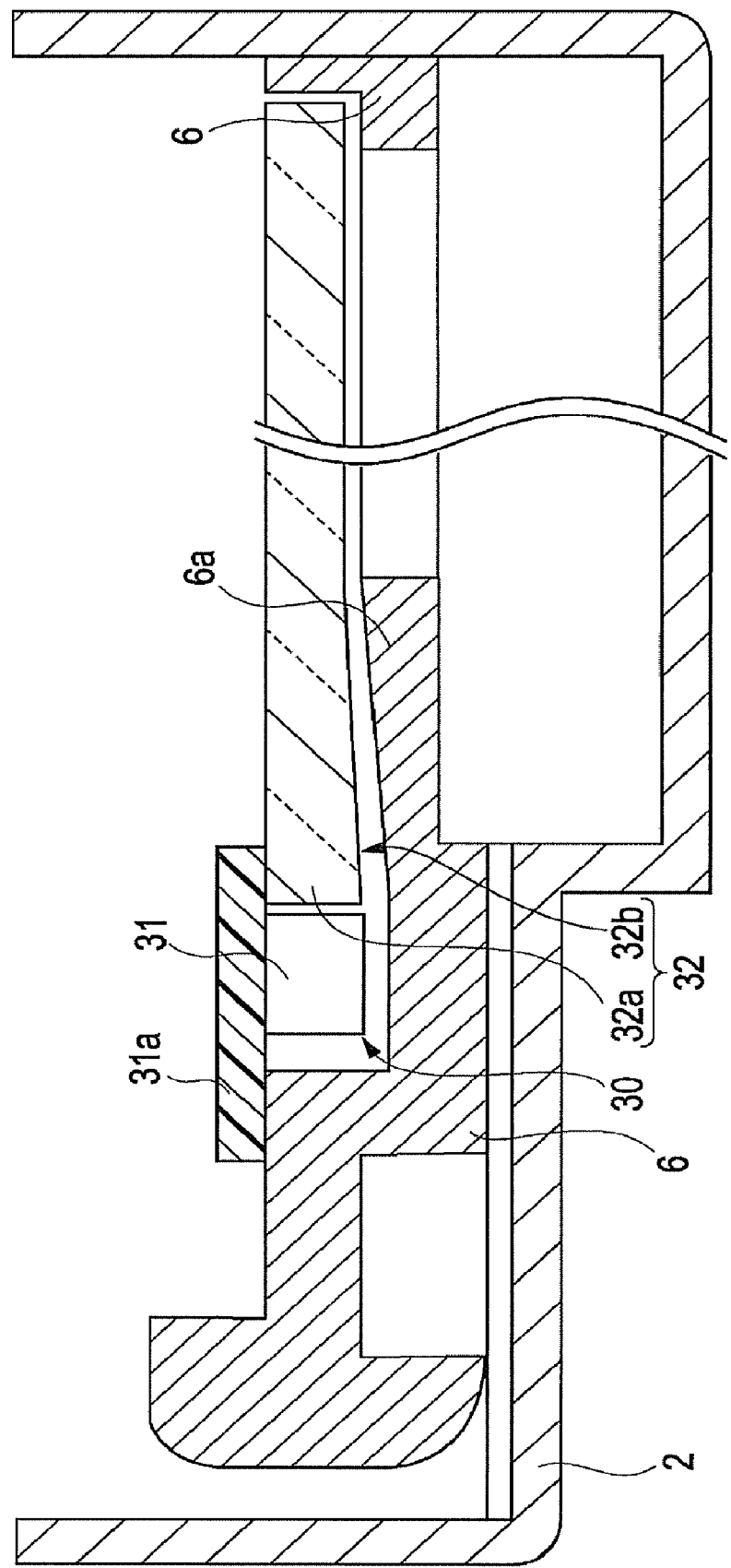
FIG. 5 is a sectional view for explaining a frame used in the liquid crystal device according to the first embodiment.

As shown in FIG. 5, the frame 6 has a frame protrusion 6*a* covering the surface of the inclined portion 32*b* of the light guiding plate 32 along an exterior outline of the inclined portion 32*b*. The frame 6 may have any structure as long as it can receive and protect the light source circuit substrate 31*a*, the light guiding plate 32, and a light diffusing plate (not shown) therein. For example, it is preferable that the frame 6 has a structure having a rectangular exterior as a whole.

This is because it is possible to more securely fix the first displaying panel 10 and the second displaying panel 20 by using the frame 6.

Further, as shown in FIG. 2, by disposing the frame protrusion 6*a* at a predetermined position so as to correspond to the inclined portion 32*b* of the light guiding plate 32, it is possible to effectively reflect the light L2' leaking from the inclined portion 32*b* of the light guiding plate 32. As a result, it is possible to suppress influence of the interference fringes on the second displaying panel 20. Accordingly, it is possible to effectively use the light L from the light source 31 and to construct the electro-optical device 1 having high brightness.

The advantage of the structure in which the frame protrusion 6*a* is provided to a predetermined portion of the frame 6 will be described in greater detail with reference to FIG. 6.

Figure 6:
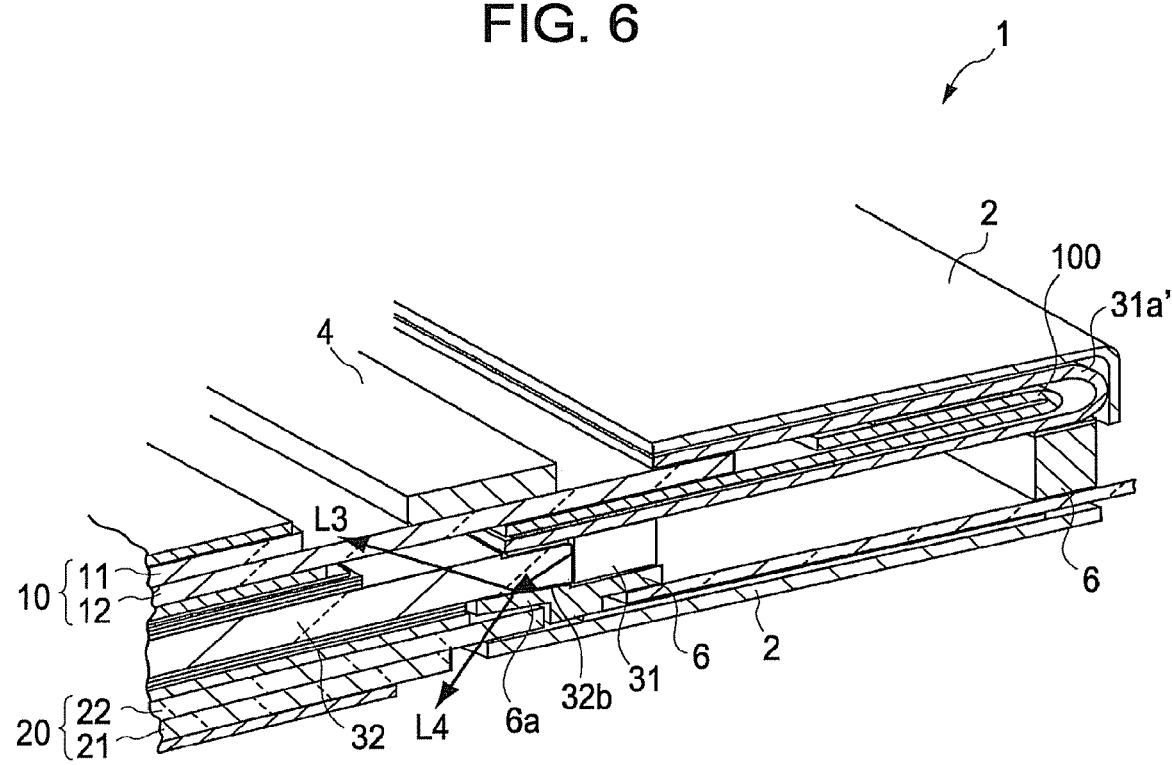
FIG. 6 is a view for explaining a position of interference fringes formed in the liquid crystal device according to the first embodiment.

FIG. 6 is a view for explaining the position of interference fringes in the liquid crystal device 1 according to the first embodiment. In FIG. 6, line L3 represents the position of the interference fringes formed on the first displaying panels 10, and line L4 represents the position of the interference fringes formed on the second displaying panel 20.

In FIG. 6, in the case in which it is possible to perfectly prevent light from leaking by the presence of the frame protrusion 6*a*, the interference fringes attributable to the line L4 is not formed. However, even in the case in which it cannot perfectly prevent light from leaking by the frame protrusion 6*a*, it is possible to suppress influence of the interference fringes on the second displaying panel 20 because it is possible to effectively reflect the leaked light.

With the structure shown in FIG. 6, it is possible to change the position of the interference fringes. Accordingly, it is possible to construct the first displaying panel 10 and the second displaying panel 20 not to be affected by the interference fringes. That is, it is possible to suppress influence of the interference fringes on the displaying regions 17 and 27 of the first and second displaying panels 10 and 20 to the minimum.

As shown in FIGS. 6 and 2, the frame protrusion 6*a* has an angle to the horizontal direction. It is preferable that the angle is set to be equal to an angle of the inclined portion 32b of the light guiding plate 32. The angle may be set in a range from 1° to 40°.

By setting the angle of the frame protrusion 6a in such range, it is possible to control the positions of the interference fringes, which can lead to suppress influence of the interference fringes on the second displaying panel 20.

Accordingly, it is preferable that the angle of the frame protrusion 6a is set to be in a range from 1° to 20°, and more preferably in a range from 2° to 15°.

The angle of the frame protrusion 6a is substantially equal to the inclined portion 32b of the light guiding plate 32 so that the frame protrusion 6a engages the inclined portion 32b of the light guiding plate 32 and covers the surface of the inclined portion 32b of the light guiding plate 32 while being in parallel with the surface of the inclined portion 32b.

Figure 7:
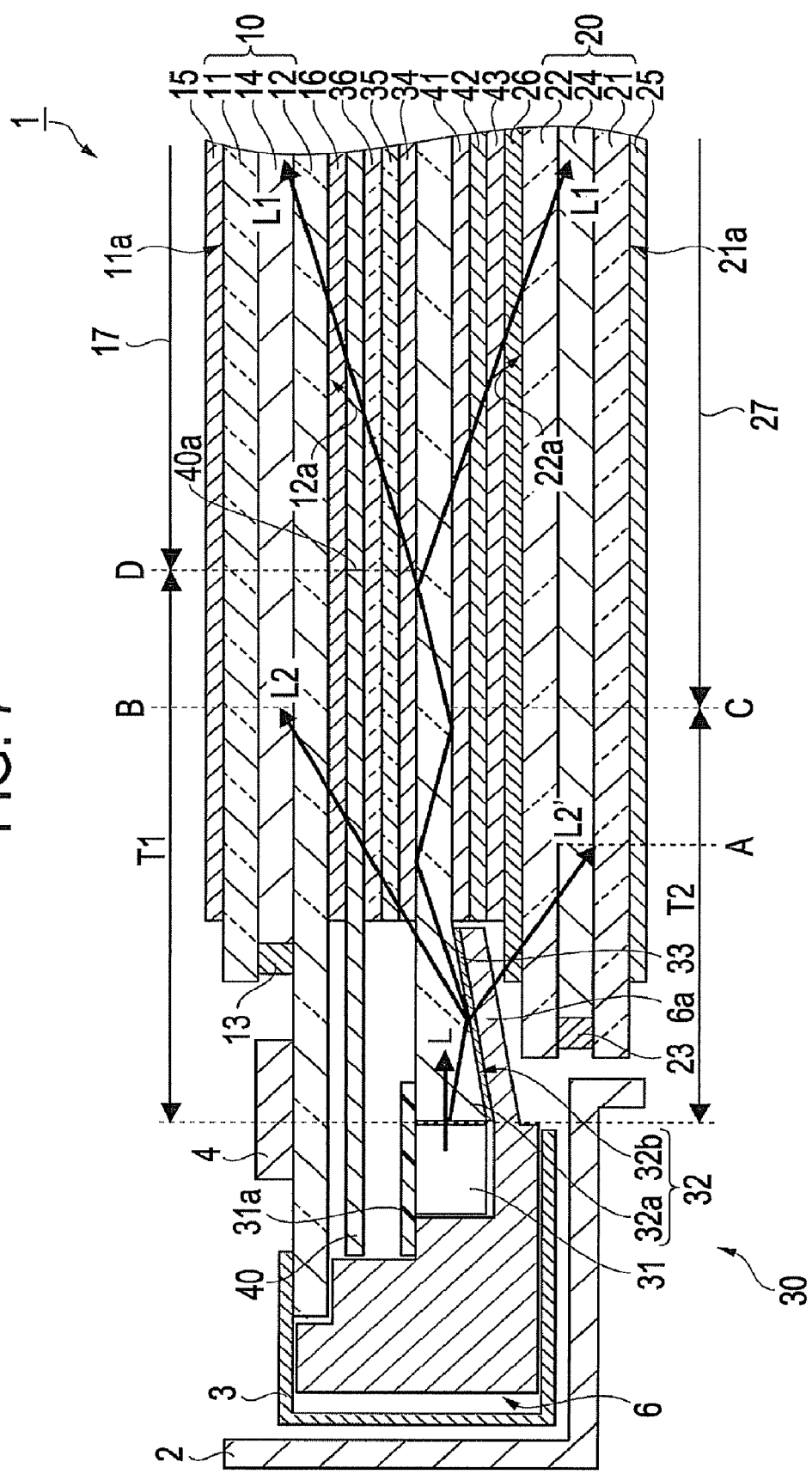
FIG. 7 is a schematic sectional view illustrating the liquid crystal device according to a first modification of the first embodiment.

As shown in FIG. 7, it is preferable that a light reflective portion 33 is provided between the frame protrusion 6a and the inclined portion 32b of the light guiding plate 32.

This is because it is possible to effectively prevent the light from leaking from the inclined portion 32b of the light guiding plate 32 by disposing the light reflective portion 33 at a predetermined position, which leads to suppress influence of the interference fringes on the second displaying panel 20.

The light reflective portion 33 is constituted by a thin film metal reflective member made of aluminum, nickel, copper, silver, chrome, or stainless steel, or by a thin film resin layer containing a light reflective material, such as silver particles or aluminum particles therein.

Further, even though it is not shown, it is preferable that the frame protrusion 6a is a light reflective member.

By such structure of the frame protrusion 6a, it is possible to simplify the structure of the frame 6 and improve the light reflective characteristic of the frame protrusion 6a.

The frame protrusion 6a is preferably made of a metal, such as aluminum, nickel, copper, silver, chrome, and stainless steel, or made of a compound resin containing a light reflective material, such as silver particles or aluminum particles. It is further preferable that the entire body of the frame is made of metal or compound resin.

Light Source Circuit Substrate

As shown in FIGS. 8A and 8B, a typical example of the light source circuit substrate 31a received in the frame 6 is a flexible circuit substrate on which the light source 31 is mounted.

The light source circuit substrate 31a is a circuit board having a flexible substrate having flexibility and made of polyimide resin. The light source 31 is mounted on one end portion of the light source circuit substrate 31a and panel connection terminals (not shown) are provided to another end portion of the light source circuit substrate 31a. The light source 31 and the panel connection terminals are electrically connected to each other via electric wires.

Even though it is not shown, the surface of the flexible circuit substrate serving as the light source circuit substrate 31a is covered with a dielectric film except for a mounting region of the light source 31, a mounting region of the panel connection terminals, and a mounting region of test terminals.

The light source 31 mounted on the light source circuit substrate 31a may be generally constituted by a light emitting diode (LED) and alternatively by a fluorescent lamp or a glow lamp.

As shown in FIGS. 8A and 8B, it is preferable that the light source circuit substrate 31a includes a light source mounting portion 31b and extension portions 31d and 31f which are provided to pull out wirings from the from the light source mounting portion 31b.

That is, the light source mounting portion 31b takes generally a rectangular shape and each of the extension portions 31d and 31f takes a strip shape elongated from an end of the light source mounting portion 31b so that a combination of the light source mounting portion 31b and the extension portions 31d and 31f forms the character "L" form as a whole. Further, it is preferable that each extension portion 31d, 31f has a bendable portion (line) 31e in the middle portion thereof so that each extension portion 31d, 31f can be folded inward or outward at the bendable portion 31e.

Thanks to such structure of the light source circuit substrate 31a, it is possible to easily mount the light source circuit substrate 31a on the frame 6 and to easily align the light guiding plate 32 in the frame 6 with the light source circuit substrate 31a.

FIG. 9 shows another example of a light source circuit substrate 31a' having a light source 31. The light source circuit substrate 31a' has a multi-layered fold-flat structure.

With such multi-layered fold-flat structure, the light source circuit substrate 31a' has high strength even if the light source circuit substrate 31a' is made very thin, contributes to space-saving in the liquid crystal device 1, and also contributes to enlargement of mounting areas of the light source circuit substrate 31a'.

Further, since the light source circuit substrate 31a' has the multi-layered structure, mountability and alignment with respect to the frame 6. Further, it is possible to easily and precisely align the light source circuit substrate 31a' with the light guiding plate 32.

In the light source circuit substrate 31a' shown in FIG. 9, the light source mounting portions 31b', 31c', and 31f' substantially have a triple-layer structure. Accordingly, it is possible to mount various electronic parts (not shown) as well as the light source (not shown) on the light source mounting portions 31b', 31c', and 31f'.

In the light source circuit substrate 31a' shown in FIG. 9, the lowermost light source mounting portion 31f' has an extension portion 31g' extending from the side thereof and a connector 31i' is provided on the extension portion 31g' so that electronic parts can be connected to the connector 31i'. The leading end of the extension portion 31g' is further folded back so as to form a folded-back portion 31h'.

Holes 31e' provided at both end portions of the light source circuit substrate 31a' shown in FIG. 9 serve as alignment holes used to align the light source circuit substrate 31a'. That is, the holes 31e' and bosses 101 of the folded member 100 shown in FIG. 6 are engaged with each other so that the light source circuit substrate 31a' is quickly fixed to a predetermined position.

Besides, au enforcement plate (not shown) may be prepared. In this case, both the enforcement plate and the light source circuit substrate 31a' may have holes, respectively and a jig is provided so as to pass through the holes of the enforcement plate and the light source circuit substrate 31a'. By the use of the jig, it is possible to easily align the light source circuit substrate 31a'.

Light Guiding Plate

Figure 10A:
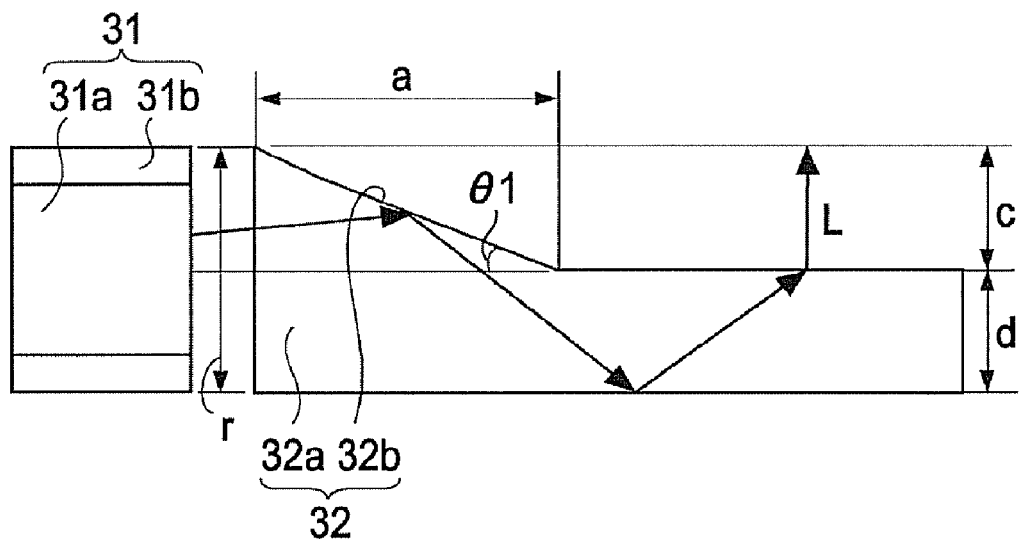
FIGS. 10A and 10B are views for light reflection condition of light on the light guiding plate used in the liquid crystal device according to the first embodiment.

As shown in FIG. 10A, the light guiding plate 32 having the inclined portion 32b is used as a light guiding plate 32 in order to guide the light L uniformly over the entire surface thereof.

The light guiding plate 32 is a plate member made of a light transmissible material, such as acryl resin. On one side of the light guiding plate, on which the first displaying panel 10 is arranged, a diffusing sheet 34, a first prism sheet 35, and a second prism sheet 36 are sequentially arranged.

The diffusing sheet 34 is a sheet member having a plate shape which diffuses light emitted from the light guiding plate 32. The diffusing sheet 34 may be formed of an acryl sheet in which a diffusing agent is diffused. By the presence of the diffusing sheet 34, it is possible to level the surface brightness of the light guiding plate 32 and also it is possible to effectively prevent the reflection (brightness unevenness) of a trench form or a concave-convex form of the first prism sheet 35 and the second prism sheet 36.

Each of the first prism sheet 35 and the second prism sheet 36 includes a flat-panel shape plate member made of transparent acryl resin and a prism surface provided on one surface of the plate member, which is near the first displaying panel 10. The prism surface has periodic convex-concave irregularities (not shown), each having a triangular side surface.

As shown in FIG. 10A, the light guiding plate 32 has the inclined portion 32b which gradually becomes thicker as it becomes nearer the light source 31 at one end 32a thereof.

With such predetermined form of the end portion 32a of the light guiding plate 32, it is possible to effectively use the light L from the light source 31 and thus it is possible to realize an electro-optical device 1 (liquid crystal device) having uniform and high brightness.

With reference to FIG. 10A, the angle $\theta 1$ of an inclined surface of the inclined portion 32b to the horizontal direction is preferably in a range from 1° to 40°.

When the angle $\theta 1$ is in such range, it is possible to more effectively use the light L from the light source 31, and thus it is possible to improve the uniformity of brightness.

Accordingly, the angle $\theta 1$ is determined depending on the material and use of the light guiding plate 32, but it is preferable that the angle $\theta 1$ between the inclined surface of the inclined portion 32b and the horizontal direction is set to be in a range from 1° to 20°, and more preferably in a range from 2° to 20°.

Figure 10B:
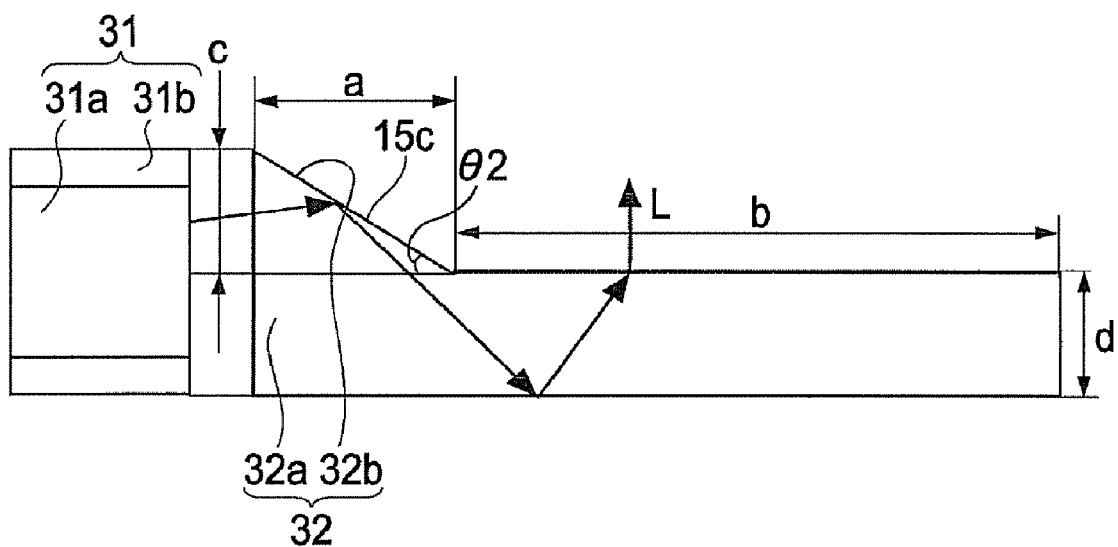

As shown in FIG. 10B, with the structure in which an angle $\theta 2$ between the inclined surface of the inclined portion 32b and the horizontal direction is larger than the angle $\theta 1$ shown in FIG. 10A, it is possible to make the interference fringes be formed closer to the light source 31 and thus it is possible to expel the interference fringes from the displaying regions 17 and 27. That is, even in the case in which the first displaying panel 10 and the second displaying panel 20 have relatively large area, it is possible to suppress influence of the interference fringes on the first and second displaying panels 10 and 20.

Further, as shown in FIG. 10A, the inclined portion 32b of the light guiding plate 32 is about 0.1 to 5 millimeters long in lateral direction.

By setting the length of the inclined portion 32b to be in a predetermined range, it is more effectively use the light L from the light source 31, and it is possible to improve the uniformity of brightness.

The length "a" of the inclined portion 32b is determined depending on the material and use of the light guiding plate 32, but it is preferable that the length "a" of the inclined portion 32b in lateral direction is set to be in a range from 0.3 to 3 millimeters, and more preferably in a range from 0.5 to 2 millimeters.

Still further, as shown in FIG. 10A, the inclined portion 32b of the light guiding plate 32 is about 0.03 to 3 millimeters thick.

By setting the thickness "c" of the inclined portion 32b is set so as to be in such range, it is possible to more effectively use the light L from the light source 31 and it is possible to improve the uniformity of brightness.

The thickness of the inclined portion 32b is determined depending on to the material and use of the light guiding plate 32, but it is preferable that the thickness "c" is set to be in a range from 0.05 to 1 millimeters, and specifically in a range from 0.07 to 0.8 millimeters.

Arrangement Relationship of Liquid Crystal Panels

Arrangement Relationship 1

As shown in FIG. 2, the second displaying panel 20 is arranged on the first side of the light guiding plate 32 on which the inclined portion 32b is disposed, and the first displaying panel 10 is arranged on the second side of the light guiding plate 32 on which the inclined portion 32b is not disposed. Further, the end portion C of the displaying region 27 of the second displaying panel 20 is arranged nearer the light source 31 than the end portion D of the displaying region 17 of the first displaying panel 10.

This is because it is possible to form the interference fringes around the end portion of the second displaying panel 2 as indicated by the line L2 in FIG. 2 even when the light leaks from the inclined portion 32b and passes through the frame protrusion 6a, by providing the inclined portion 32b having a predetermined shape to the end portion 32a of the light guiding plate 32 and talking into consideration of the positional relationship of the end portions of the first and second displaying panels 10 and 20.

Further, with the structure shown in FIG. 6, it is understood that, with respect to the second displaying panel 20, it is possible to form the interference fringes around the light source 31 as indicated by an arrow L4 when light leaks from the inclined portion 32b by arranging the end portion C of the displaying region 27 of the second displaying panel 20 nearer the light source 31 than the end portion D of the displaying region 17 of the first displaying panel 10.

On the other hand, in the structure shown in FIG. 6, with respect to the first displaying panel 10, the interference fringes are controlled so as to be formed at a position relatively far from the light source 31 as indicated by an arrow L3.

Accordingly, as shown in FIG. 2 or 6, it is possible to arrange the first displaying panel 10 so as to avoid a position where the interference fringes are formed and thus it is possible to suppress influence of the interference fringes on the displaying region 17 serving as an image displaying area of the first displaying panel 10 to the minimum by talking into consideration of the positional relationship between the end portion C of the displaying region 27 of the second displaying panel 20 and the end portion D of the displaying region 17 of the first displaying panel 10.

In the same way, by taking into consideration of the positional relationship between the end portion C of the displaying region 27 of the second displaying panel 20 and the end portion D of the displaying region 17 of the first displaying panel 10, the influence of the interference fringes on the second displaying panel 20 is substantially eliminated. As a result, it is possible to arrange the end portion C of the displaying region 27 of the second displaying panel 20 close to the light source, and thus it is possible to increase the size of the displaying region 27 serving as an image displaying portion of the second displaying panel 20.

The end portion D of the displaying region 17 of the first displaying panel 10 and the end portion C of the displaying region 27 of the second displaying panel 20 are defined by a position where a sealing member is disposed but may be defined by any position as long as the position is regarded as the substantial end of the displaying region.

Arrangement Relationship 2

As shown in FIG. 2, it is preferable that a distance T1 between the end portion D of the displaying region 17 of the first displaying panel 10 and the light source 31 is 1.01 to 10 times longer than a distance T2 between the end portion C of the displaying region 27 of the second displaying panel 20 and the light source 31. This is because it is possible to more effectively use the light L from the light source by individually restricting the distances T1 an T2 between the end portions D and C of the displaying regions 17 and 27 of the first and second displaying panels 10 and 20 and the light source 31.

It is more preferable that the distance T1 between the end portion D of the displaying region 17 of the first displaying panel 10 and the light source 31 is 1.2 to 8 times longer than the distance T2 between the end portion C of the displaying region 27 of the second displaying panel 20 the light source 31, and it is much more preferable that the distance T1 is 1.3 to 3 times longer than the distance T2.

Arrangement Relationship 3

It is preferable that area of the displaying region 27 of the second displaying panel 20 is larger than that of the displaying region 17 of the first displaying panel 10.

This is because it is possible to more effectively use the light L from the light source by talking into consideration of the relationship of areas of the first displaying panel 10 and the second displaying panel 20.

That is, If the first displaying panel 10 has a small size, it is possible to easily arrange the first displaying panel so as to avoid a position where the interference fringes are formed, which leads to easily suppress influence of the interference fringes on the displaying region 17 of the first displaying panel 10 which serves as an image displaying portion.

Further, this arrangement can substantially eliminate influence of the interference fringes on the second displaying panel 20. Accordingly, it is possible to arrange the end portion C of the displaying region 27 of the second displaying panel 20 closer to the light source 31, which leads to increase the size of the displaying region 27 serving as the image displaying portion.

Accordingly, it is possible to effectively use the light L from the light source 31 while eliminating the influence of the interference fringes on the displaying regions 17 and 27.

Manufacturing Method of a Liquid Crystal Panel

The electro-optical device 1 (liquid crystal device) according to the above-mentioned embodiment can be obtained by a manufacturing method of the electro-optical device 1 including the lighting device having the light guiding plate 32 received in the frame 6 and the light source 31 which emits light L to the light guiding plate 32.

In greater detail, the manufacturing method of the electro-optical device 1 includes a process of preparing the light-guiding plate 32 having the inclined portion 32b which becomes thicker as it becomes nearer the light source at the one end 32a thereof, a process of preparing the frame 6 with the frame protrusion 6a covering the surface of the light guiding plate 32 along an outer profile of the inclined portion 32a, a process of allowing the frame 6 to receive the light guiding plate 32 therein in a manner such that the inclined portion 32 of the light guiding plate 32 engages with the frame protrusion 6a of the frame 6, and a process of arranging the first display panel 10 and the second displaying panel 20 in parallel with the light guiding plate 32.

That is, the manufacturing method of the electro-optical device 1 includes following (1) to (4) processes. In (4) process, the second displaying panel 20 is arranged on the first side of the light guiding plate 32 on which the inclined portion 32b is disposed, and the first displaying panel 10 is arranged on the second side of the light guiding plate 32 on which the inclined portion 32b is not disposed. The end portion C of the displaying region 27 of the second displaying panel 20 is arranged nearer the light source 31 than the end portion D of the displaying region 17 of the first displaying panel 10;

(1): preparing the light guiding plate 32 having the inclined portion 32b at the end 32a thereof, the inclined portion 32b becoming thicker as it becomes nearer the light source 31 (light guiding plate preparing process);

(2): preparing the frame 6 having the frame protrusion 6a in order to cover the surface of the light guiding plate 32 along the surface of the inclined portion 32b (frame preparing process);

(3) placing the light guiding plate 32 into the frame 6 in a manner such that the frame protrusion 6a of the frame 6 engages with the inclined portion 32b of the light guiding plate 32 (light guiding plate placing process); and (4) arranging the first and second displaying panels 10 and 20 on both sides of the light guiding plate 32, respectively (panel arranging process).

(1) Light Guiding Plate Preparing Process

This is a process to prepare the light guiding plate 32 having the inclined portion 32b which becomes thicker as it becomes nearer the light source 31. The light guiding plate 32 partially shown in FIGS. 10A and 10B is prepared by a known injection-molding method.

(2) Frame Preparing Process

Next, the frame 6 having the frame protrusion 6a which covers the surface of the inclined portion 32b of the light guiding plate 32 is prepared. That is, the frame 6 shown in FIG. 5 is prepared by a known injection molding method.

By using the frame 6 having such structure, it is possible to more securely fix the first display panel, effectively prevent the light from leaking from the inclined portion 32b of the light guiding plate 32, and effectively use the light L from the light source 31.

Upon preparing the frame 6 as described above, it is preferable that the light reflective portion 33 is provided between the frame protrusion 6a and the inclined portion 32 of the light guiding plate 32, or the frame protrusion 6a is provided by a light reflective member.

(3) Light Guiding Plate Placing Process

Next, the light guiding plate 32 is placed in the frame 6 in a manner such that the inclined portion 32b engages with the frame protrusion 6a of the frame 6. That is, as shown in FIG. 2, this process is to place the light guiding plate 32 at a predetermined position in the frame 6.

(4) Panel Arranging Process

Next, the first and second displaying panels 10 and 20 are arranged on both sides of the light guiding plate 32, respectively.

That is, as shown in FIG. 2, the second displaying panel 20 is arranged on the first side of the light guiding plate 32 on which the inclined portion 32b is disposed, and the first displaying panel 10 is arranged on the second side of the light guiding plate 32 on which the inclined portion 32b is disposed. Further in this process, the end portion C of the displaying region 27 of the second displaying panel 20 is arranged nearer the light source 31 than the end portion D of the displaying region 17 of the first displaying panel 10.

By manufacturing the liquid crystal device 1 by providing the inclined portion 32b to the end portion 32a of the light guiding plate 32 and taking into consideration of the positional relationship between the first displaying panel 10 and the second displaying panel 20, it is possible to substantially eliminate influence of the interference fringes on the second displaying panel 20 and it is possible to suppress influence of the interference fringes on the displaying region 17 serving as an image displaying portion of the first displaying panel to the minimum. That is, it is possible to manufacture the liquid crystal device 1 which is less affected by the interference fringes.

(5) FPC Substrate Mounting Process

In addition, before or after the panel arranging process, as shown in FIGS. 3 and 4, an FPC substrate 3 is mounted on end portions of the first displaying panel 10 and the second displaying panel 20 using a conductive material (not shown) so as to serve as an external terminal connector.

The invention is not limited to the FPC substrate 3 shown in FIGS. 3 and 4, but the light source circuit substrate 31a' shown in FIG. 9 may be used as the external terminal connector.

Figure 11:
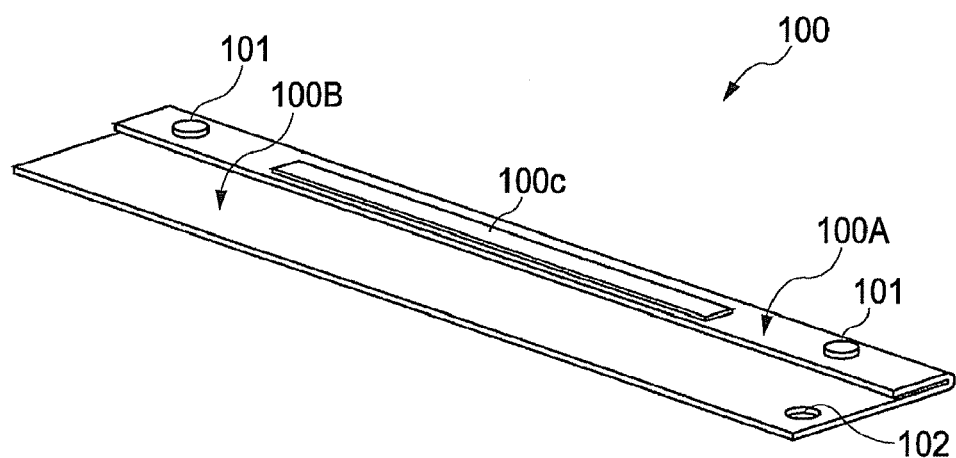
FIG. 11 is a perspective view illustrating a folded plate for a flexible circuit substrate.
Figure 12:
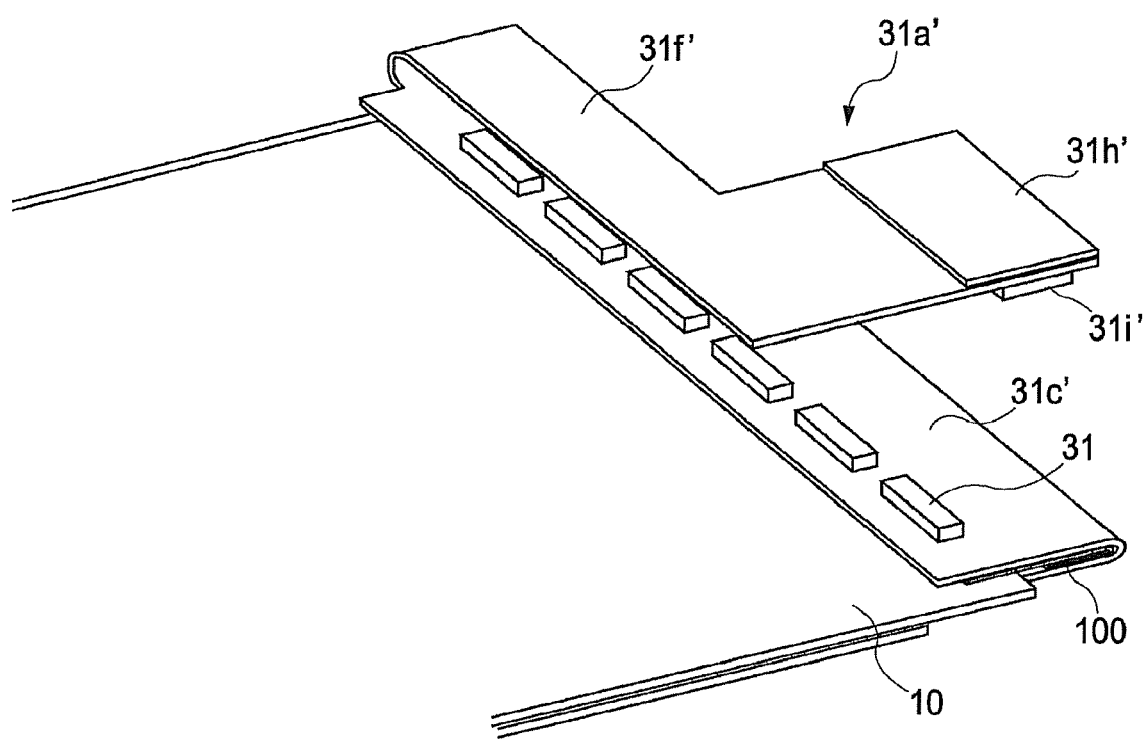
FIG. 12 is a perspective view illustrating mounting condition of the flexible circuit substrate.

That is, in the case in which the first displaying panel 10 and the second displaying panel 20 are very thin, as shown in FIG. 11, the first and second displaying panels 10 and 20 engage with the folded member 100 and the light source circuit substrate 31a' is mounted on the folded member 100 using a conductive material (not shown).

In this case, functions of the light source circuit substrate 31a' and the FPC substrate 3 serving as the external terminal connector are performed by one element, and thus it is possible to save a large space. Further, since the light source circuit substrate 31a' is folded back by an angle of 180°, rebound resilience is strong even if the light source circuit substrate 31a' is very thin. The folded member 100 can restrict the rebound resilience of the light source circuit substrate 31a'.

In order to more highly restrict the rebound resilience of the light source circuit substrate 31a', an adhesive layer or a glue layer 100c is provided to the folded member 100 in order to secure the coupling condition of the folded member 100 and the light source circuit substrate 31a'.

The folded member 100 shown in FIG. 11 may take a film form made of a metal, such as stainless steel or aluminum, a ceramic material, or a plastic material.

Second Embodiment

Figure 13:
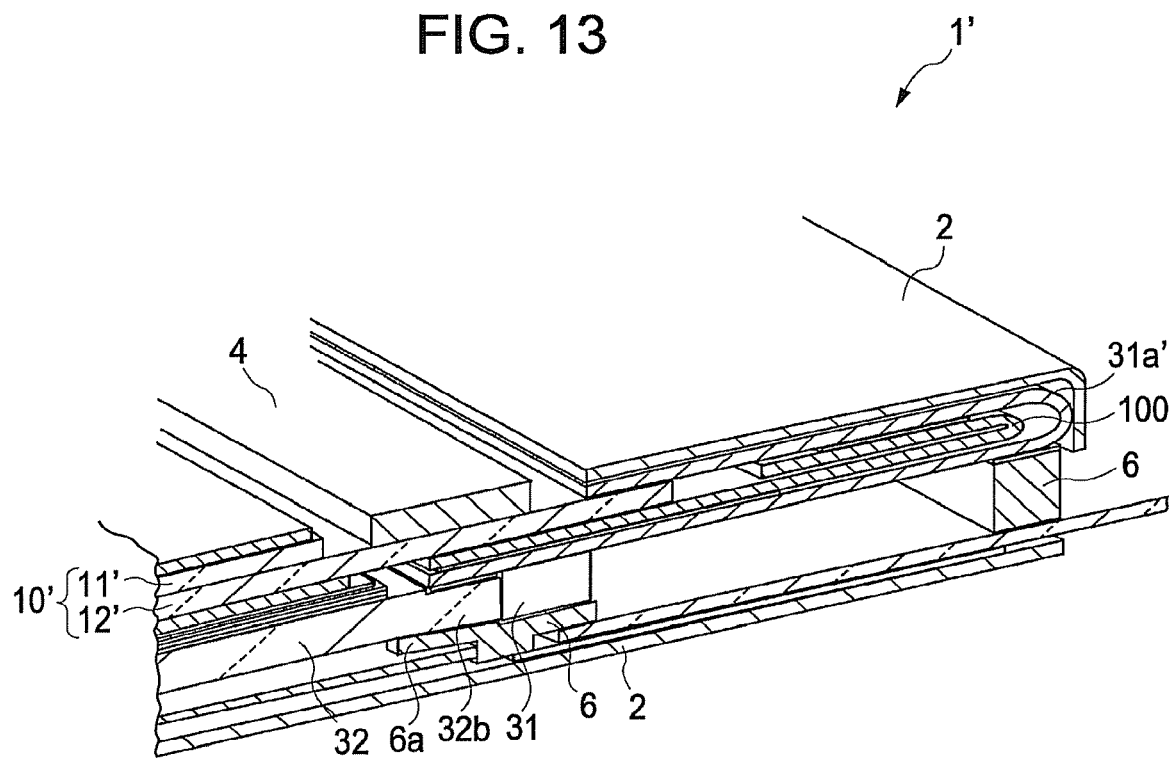
FIG. 13 is a view illustrating a liquid crystal device according to a second embodiment.

The second embodiment relates to an electro-optical device 1'. As shown in FIG. 13, according to the second embodiment, the electro-optical device 1' (liquid crystal device) includes a lighting device 30 having a light guiding plate 32 received in a frame 6 and a light source 31 emitting light L toward the light guiding plate 32, and a displaying panel 10'. The light guiding plate 32 has au inclined portion 32b which becomes thicker as it becomes nearer the light source 31 at an end portion 32a thereof. The frame 6 has a frame protrusion 6a covering the light guiding plate 32 and the inclined portion 32b along the surface of the inclined portion 32b.

Accordingly, the electro-optical device is a single-sided displaying type displaying device having a single displaying panel.

That is, according to the second embodiment, it is possible to realize the liquid crystal device 1' which can suppress influence of interference fringes on the displaying panel, effectively use light L from the light source 31, and has enhanced brightness, by effectively reflecting light L2' leaking from the inclined portion 32b by the use of the frame protrusion 6a provided to the frame 6.

Further, it is possible to realize the liquid crystal device 1' with enhanced brightness, in which displacement of light guiding plate 32 is very small even at a high ambient temperature because the light guiding plate 32 is securely fixed by the use of the frame protrusion 6a provided to the frame 6.

Other elements of the liquid crystal device 1' according to the second embodiment are the same as those of the liquid crystal device 1 according to the first embodiment. Accordingly, explanation of the same elements is omitted.

Third Embodiment

The third embodiment relates to an electronic apparatus having the electro-optical device (liquid crystal device) according the first embodiment.

Figure 14:
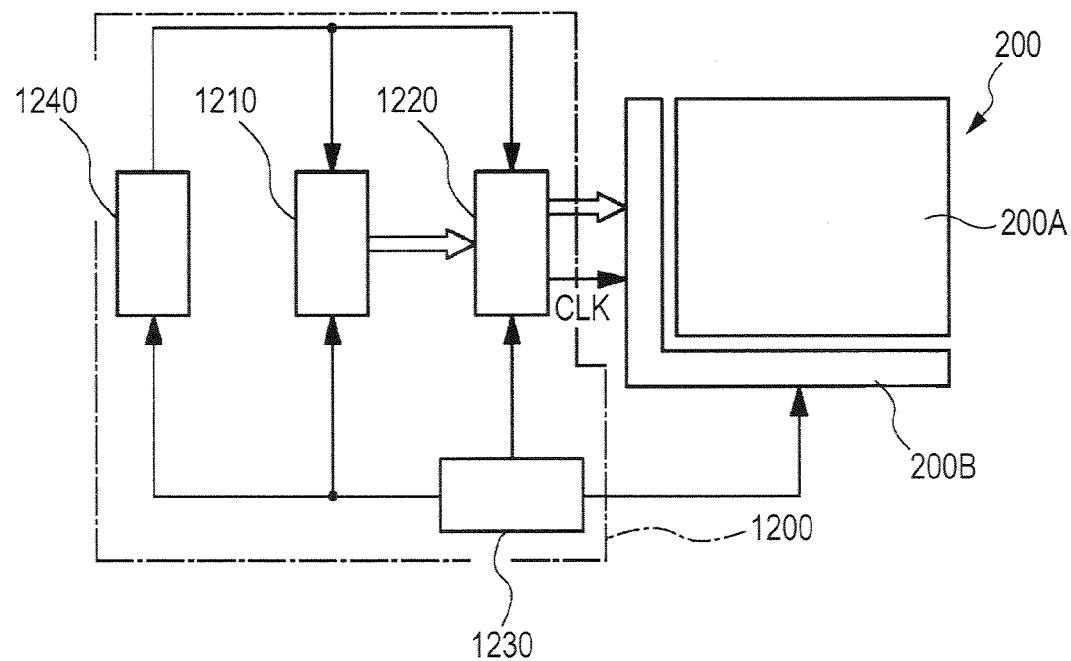
FIG. 14 is a schematic block diagram illustrating the overall structure of an electronic apparatus according to a third embodiment.
Figure 15:
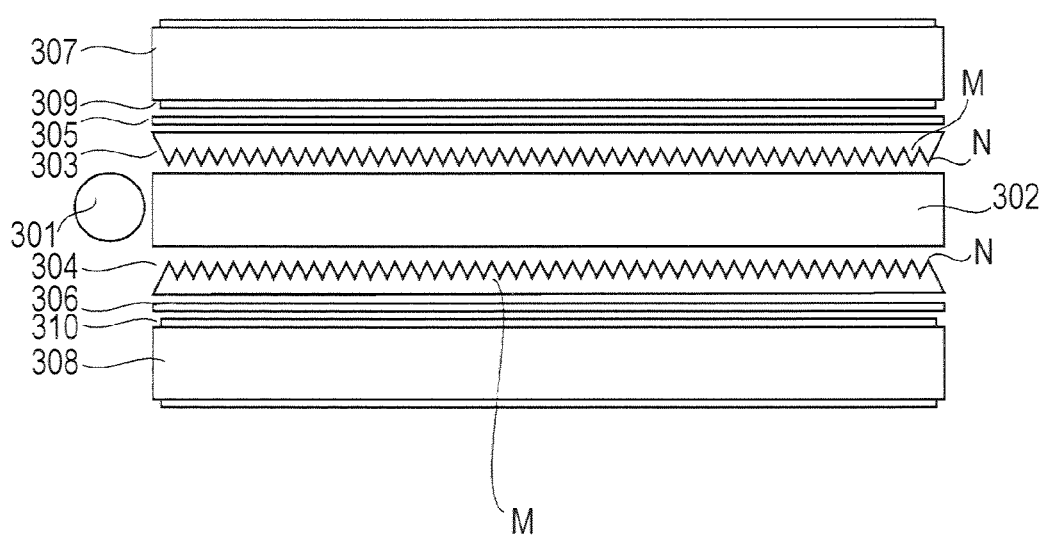
FIG. 15 is a view illustrating a double-sided displaying type liquid crystal device according to a known art.

FIG. 14 shows the overall structure of the electronic apparatus according to this embodiment. The electronic apparatus includes a displaying panel 200A included in a liquid crystal device 200 and a control unit 200B which controls operations of the display panel 200A. The control unit 200B includes a display information output source 1210, a display processing circuit 1220, a power source circuit 1230, and a timing generator 1240.

The display information output source 1210 may include a memory unit comprised of a Read Only Memory (ROM) and/or a Random Access Memory (RAM), a storage unit comprised of a magnetic recording disk and/or an optical recording disk, and a tuning circuit which tulles and outputs digital image signals. The display information output source 1210 supplies display information in a predetermined format of image signals to the display processing circuit 1220 on the basis of a variety of clock signals CLK generated by the timing generator 1240.

The display processing circuit 1220 includes a variety of known circuits, such as a serial-to-parallel converter circuit, an amplifying-inverting circuit, a rotation circuit, a gamma correction circuit, and a clamp circuit, performs processing of the display information, and supplies the image signals and the clock signals CLK together to a driving circuit in the control unit 200B. The driving circuit can include a first electrode driving circuit, a second electrode circuit, and a test circuit. The power source circuit 1230 functions to supply predetermined voltages to the above-mentioned elements.

The electronic apparatus according to this embodiment may include the lighting device having uniform brightness and high optical reliability. In the lighting device, the light guiding plate 32 has the inclined portion 32b which becomes thicker as it becomes nearer the light source 31 at the end portion 32a thereof and the inclined portion 32b has an inclined surface or a curved surface at a position where it faces the light source 31.

According to the invention, by adopting the structure in which an inclined portion having a predetermined shape is provided to an end portion of a light guiding plate and a frame has a frame protrusion covering the inclined portion of the light guiding plate, and also it is possible to provide an electronic apparatus having the electro-optical device, it is possible to provide an electro-optical device which is less affected by the interference fringes regardless of displaying type including a double-sided displaying type or a single-sided displaying type.

Further, by taking into consideration of the arrangement relationship between double-sided displaying panels and positional relationship between end portions of the double-sided displaying panels, it is possible to provide an electro-optical device which is less affected by interference fringes and an electronic apparatus having the electro-optical device.

Accordingly, the electro-optical device of the invention can be applied to electronic apparatuses having a liquid crystal device including switching elements such as TFT elements or TFD elements. For example, the electro-optical device of the invention may be applied to a mobile phone, a personal computer, a liquid crystal TV set, a view-finder type monitor, a direct-view type vide tape recorder, a car navigation device, a pager, an electrophoretic device, an electronic organizer, a calculator, a word processor, a workstation, a video conferencing phone, a POS terminal, an electronic apparatus with a touch panel, and an electronic apparatus with a field emission element (FED: Field Emission Display or SCEED: Surface-Conduction Electron-Emitter Display).

What is claimed is:

1. An electro-optical device, comprising:
   a lighting device including a light guiding plate and a light source emitting light to the light guiding plate which are received in a frame; and
   a displaying panel,
   wherein the light guiding plate has an inclined portion which gradually becomes thicker as it becomes nearer the light source, and wherein the frame as a frame protrusion facing the inclined portion of the light guiding plate.

2. The electro-optical device according to claim 1, wherein the frame protrusion has a shape corresponding to an inclination of the light guiding plate, and an angle of the light guiding plate is substantially equal to an angle of the frame protrusion.

3. The electro-optical device according to claim 1, wherein the displaying panel comprises a first displaying panel and a second displaying panel which have different displaying areas from each other, the second displaying panel having a relatively large displaying area is arranged on a first surface of the light guiding plate on which the inclined portion is disposed, and the first displaying panel having a relatively small displaying area is arranged on a second surface of the light guiding plate on which the inclined portion is not disposed.

4. The electro-optical device according to claim 3, wherein an end of a displaying region of the second displaying panel is arranged nearer the light source than an end of a displaying region of the first displaying panel.

5. The electro-optical device according to claim 1, further comprising a light reflective portion provided between the frame protrusion and the inclined portion of the light guiding plate.

6. The electro-optical device according to claim 1, wherein the frame protrusion is provided by a light reflective member.

7. An electronic apparatus including the electro-optical device according to claim 1.

* * * * *